US012699035B2

(12) United States Patent
Gordon et al.

(10) Patent No.: US 12,699,035 B2
(45) Date of Patent: Aug. 4, 2026

(54) POLARIZATION SELECTIVE REFLECTION GEOMETRY TRAPPING OF NANOPARTICLES

(71) Applicant: UVic Industry Partnerships Inc., Victoria (CA)

(72) Inventors: Reuven Gordon, Victoria (CA); Behnam Khosravi, Victoria (CA)

( * ) Notice: Subject to any disclaimer, the term of this patent is extended or adjusted under 35 U.S.C. 154(b) by 28 days.

(21) Appl. No.: 18/448,082

(22) Filed: Aug. 10, 2023

(65) Prior Publication Data

US 2024/0053249 A1    Feb. 15, 2024

Related U.S. Application Data

(60) Provisional application No. 63/397,782, filed on Aug. 12, 2022.

(51) Int. Cl.
*G01N 15/14* (2024.01)
*G01N 15/01* (2024.01)

(52) U.S. Cl.
CPC ............. *G01N 15/14* (2013.01); *G01N 15/01* (2024.01); *G01N 2015/1493* (2013.01); *G01N 2015/1497* (2013.01)

(58) Field of Classification Search
CPC .... G01N 15/14; G01N 15/01; G01N 15/0211; G01N 15/1433; G01N 15/1434; G01N 2015/1493; G01N 2015/0294; G01N 2015/1006; G01N 2015/1497; G01N 2015/0216; G01N 2015/0038
See application file for complete search history.

(56) References Cited

U.S. PATENT DOCUMENTS

| | | | | |
|---|---|---|---|---|
| 8,854,621 B1 * | 10/2014 | Muschol | ................ | G01N 21/47 |
| | | | | 356/336 |
| 2010/0301234 A1 * | 12/2010 | Dogariu | ................. | C12N 13/00 |
| | | | | 250/492.1 |
| 2012/0288925 A1 * | 11/2012 | Wang | ..................... | G02B 21/32 |
| | | | | 356/73 |
| 2013/0003175 A1 * | 1/2013 | Kenmochi | ........... | G02B 5/3008 |
| | | | | 359/452 |

(Continued)

OTHER PUBLICATIONS

Jess et al., "Dual beam fibre trap for Raman microspectroscopy of single cells," Optics Express, 14(12): 5779-5791 (2006).

(Continued)

*Primary Examiner* — Sang H Nguyen
(74) *Attorney, Agent, or Firm* — Klarquist Sparkman, LLP

(57)    ABSTRACT

Optical tweezer methods and apparatus that operate in reflection mode use polarization selection to isolate an input laser signal from optical signals associated with trapping. A trapping aperture or apertures can be defined in a conductive film such as a gold film have a polarization-dependent reflectance due to asymmetry of the aperture, and a reflected beam is polarized differently than an incident beam. Polarization of scattered light from the aperture can thus be distinguished from polarization of the incident beam. In some cases, an aperture is not used but instead polarizing nanoparticles, such as nanorods, are detected based on either transmitted or reflected optical radiation in a different state of polarization than that of the incident beam.

15 Claims, 7 Drawing Sheets

(56)                    References Cited

U.S. PATENT DOCUMENTS

| | | | | |
|---|---|---|---|---|
| 2013/0033739 A1 * | 2/2013 | Flatte | G02F 1/195 | |
| | | | | 977/932 |
| 2014/0132943 A1 * | 5/2014 | Chou | G01N 21/49 | |
| | | | | 356/336 |
| 2014/0377792 A1 * | 12/2014 | Dasgupta | G01N 21/64 | |
| | | | | 250/459.1 |
| 2016/0033402 A1 * | 2/2016 | Lin | G01N 21/553 | |
| | | | | 356/445 |
| 2017/0016821 A1 * | 1/2017 | Unlu | G01N 21/45 | |
| 2019/0113824 A1 * | 4/2019 | Fontana | G02F 1/195 | |

OTHER PUBLICATIONS

Jones et al., "Raman spectroscopy of single nanoparticles in a double-nanohole optical tweezer system," Journal of Optics, 17(10): 102001 (2015) (corresponding copy from arXiv:1507.06374).

Kerman et al., "Raman fingerprinting of single dielectric nanoparticles in plasmonic nanopores," accepted Manuscript for Nanoscale, 7(44): 18612-18618 (2015).

Peri et al., "Quantification of low affinity binding interactions between natural killer cell inhibitory receptors and targeting ligands with a self-induced back-action actuated nanopore electrophoresis (SANE) sensor," accepted Manuscript for Nanotechnology, 32(4): 045501 (2021).

Khosravi et al., "Reflection mode optical trapping using polarization symmetry breaking from titled double nanoholes," Optics Express, 31(2): 2621-2627 (2023).

Chen et al., "High spatial resolution nanoslit SERS for single-molecule nucleobase sensing," Nature Communications, 9(1): 1733 (2018).

* cited by examiner (without polarizer)

(with polarizer)

(without polarizer)

(with polarizer)

POLARIZATION SELECTIVE REFLECTION GEOMETRY TRAPPING OF NANOPARTICLES

CROSS REFERENCE TO RELATED APPLICATION

The present application claims the benefit of U.S. Provisional Application No. 63/397,782, filed Aug. 12, 2022, which is incorporated herein by reference in its entirety.

FIELD

The disclosure pertains to optical trapping.

BACKGROUND

Shaped nanoapertures in metal films have been used by many researchers worldwide to trap and analyze individual nanoparticles, including single proteins, quantum dots, and nanoflakes. Shaped apertures have typically been used in a transmission mode and detect changes in laser intensity associate with trapping. Reflection mode approaches exhibit significant background signal and noise due to the high reflectance of the metallic films used to define the trapping volume. This background and noise can make it difficult or impractical to detect trapping. In view of these and other deficiencies, improved methods and apparatus are needed, particularly for reflection mode operation.

SUMMARY

Disclosed herein are optical tweezer setups in reflection mode that use polarization selection to isolate laser signal from a region of trapping object. In some examples, a trapping aperture or apertures in a conductive film such as a metal film (in some cases, a gold film) has a defined polarization due to asymmetry of the aperture, and a reflected beam is polarized differently than an incident beam. Polarization of scattered light from the aperture can thus be distinguished from polarization of the incident beam. In some cases, an aperture is not used but instead polarizing nanoparticles, such as nanorods are detected based on either transmitted or reflected optical radiation in a different state of polarization than that of the incident beam. Typically, an aperture localizes field to trap objects through optical forces, which results in change in the polarization-selected reflection from the aperture so that the trapping of objects in the range of 0.5 nm-100 nm can be detected by changes in the intensity of the reflected signal with polarization orthogonal to the incident signal. It is generally not required to collect signal transmitted through a fluid sample region, thereby simplifying optical geometry and reducing scattering from the sample region. The reflection geometry allows for microfluidic delivery, or micropipette delivery, or any other forms of delivery of samples to be investigated from the opposite side of the film as the reflection geometry frees up space on the other side of the film that would not be available in the transmission geometry. Fluctuations in the reflected intensity can be used to transduce the Brownian motion of the particle into a detectable signal. This may be used to size or determine the geometry of the trapped object. A Raman filter can be used detect inelastically scattered light from the trapped nanoparticle to determine material properties. Detection systems can also be arranged for detection of fluorescence, nonlinear optical generation, and other properties, and Raman detection is only a representative example. A camera image can be situated to locate shaped apertures on the sample based on polarization dependent scattering. A variety of trapped particles can be investigated such as proteins, peptides, DNA, other biomolecules (including lipoproteins, hormones etc.), or inorganic nanoparticles. While reflection mode is advantageous, in some situations, polarization dependence can be used in transmittance.

When using reflection mode, microfluidics can be provided on a far side of a specimen without interfering with access to the specimen. In addition, highly absorbing or scattering media can be used as a transmitted beam is not needed. For example, specimen fluids can include fluids such as crude oil and blood serum. For the same reason, the specimen volume can also include obstructing objects such as living cells or tissue. Double nanoholes can also be identified and differentiated from single nanoholes using a polarized beam (provided by, for example, an LED and a polarizer) based on a change in polarization of the beam produced by the double nanoholes.

DETAILED DESCRIPTION

The examples are described with respect to double nanoholes (DNHs) defined in a conductive layer. However, other shapes of asymmetric apertures in a conductive layer can be used. In examples in which optically asymmetric particles are to be trapped, particle asymmetry is associated with differences between an input optical beam state of polarization (SOP) and an SOP related to particle trapping. Polarization dependence can also be used in transmissive optical systems. In reflective mode configurations, aperture symmetry can be used for polarization selection and a top surface of a trapping device can be configured to have multiple traps, microfluidics or any additional functionality such as to define a well plate or for microprinting.

Examples are described that use linear SOPs. Other polarizations can be used but are generally less convenient. In use with a DNH or other asymmetric apertures or aperture, the SOP of an input laser beam is generally at an angle with respect to the axes of the DNH or the asymmetric apertures. For a DNH, axis directions are parallel to line through centers of the apertures defining the DNH and orthogonal to this line; for other apertures, axis directions are similarly defined. The input laser beam linear SOP is oriented at an angle with respect to these axes so that a reflected beam associated with the DNH or asymmetric apertures has a polarization component that is orthogonal to the input laser beam SOP. In this way, a polarizing beamsplitter can separate the input laser beam and this reflected beam.

In transmission mode operation of a DNH, it is preferable to orient the laser polarization along the axis of the DNH to maximize the field of a given mode. However, in reflection mode operation, orientation of input laser SOP with respect to the DNH at an angle (such as 45 degrees) produces a reflected beam component in a different SOP then that of the input laser beam, permitting polarization-based beam separation.

Figure 1A:
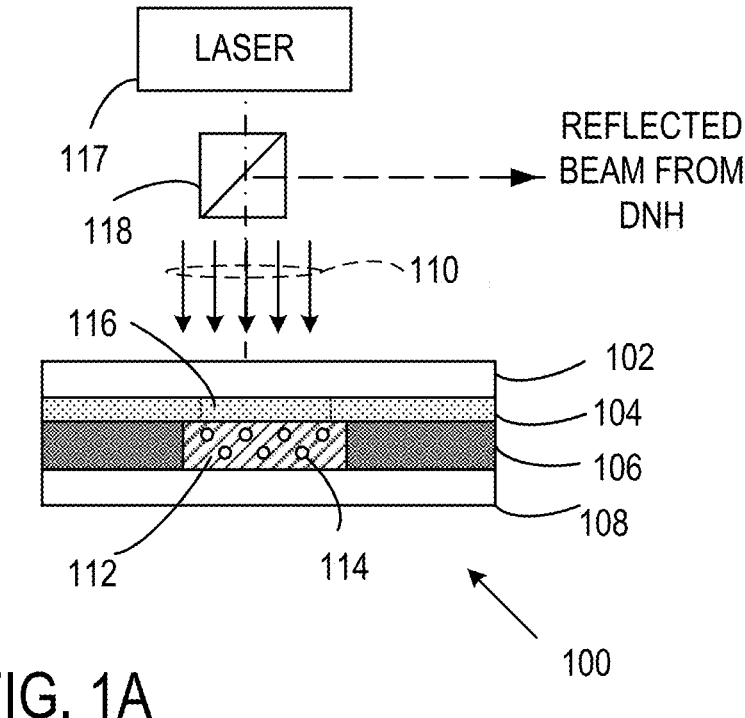
FIG. 1A illustrates illumination of double nanoholes (DNHs) defined in a gold layer.
Figure 1B:
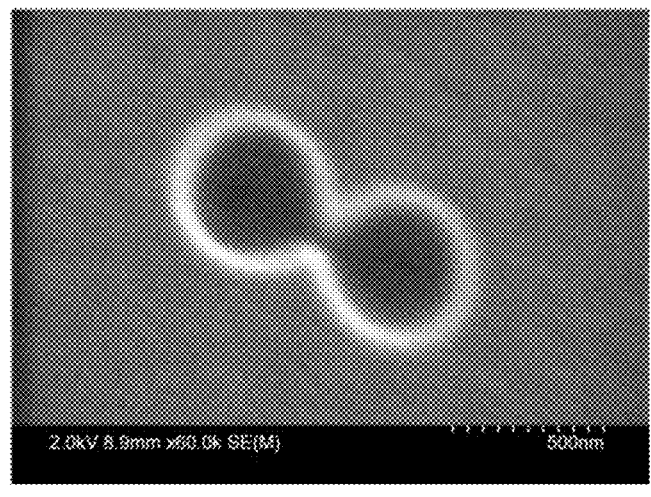
FIG. 1B is an SEM image of double nanoholes such as used in FIG. 1A.

Referring to FIGS. 1A-1B, a laser beam 110 is directed to a set of layers 100 that includes an entrance layer 102, a conductive layer 104, a spacer layer 106, and an exit layer 108. The entrance layer 102 and the exit layer 108 are selected to be transparent to the laser beam 110, and typical materials include glasses, fused silica, or others. A particular selection is made based on a laser beam wavelength. A double nanohole (DNH) is defined in a portion 116 of the conductive layer 104. The conductive layer 116 can be formed of various conductive materials such as metals. In a particular example, the conductive layer 104 is a gold layer. FIG. 1B is an SEM image of a representative DNH formed in a gold layer. The spacer layer 106 defines a volume 112 that retains a specimen to be exposed to the laser beam 110, typically a fluid sample containing particles to be trapped. As shown, the volume 112 contains a plurality of nanoparticles such as representative nanoparticle 114. In the configuration of FIG. 1A, the laser beam 110 is incident to the nanoparticles the conductive layer side (such as a gold).

In an example, DNHs are formed by directed ion beam milling a conductive layer provided as a gold layer on a gold coated microscope slide gold slide having a gold thickness between 10 nm and 1 μm such as 100 nm to define circular apertures whose centers are spaced apart by 10 nm-1000 nm. The spacer layer 106 can be an adhesive slide spacer (such as a Grace Bio-labs GBL654002 slide spacer) that is affixed to the gold slide and defines the volume 112, typically a volume of between 1 μL and 100 μL, for example, 10 μL. A sample fluid containing nanoparticles to be studied can be situated in the volume 112. A glass cover slide or cover slip can serve as the entrance layer and is affixed to the adhesive slide spacer. The optical beam can be focused with a microscope object to the volume 112.

The DNH is associated with polarization dependence in reflection and transmission. In the configuration of FIG. 1A, a reflected portion of the laser beam 110 is directed back through a polarizing beamsplitter (PBS) 118 towards a laser 117 that provides the laser beam 110 while a reflected beam portion from the DNH is reflected by the PBS 120 for detection. Double nanoholes have polarization-dependent reflectance and transmittance and the laser beam portion reflected from the conductive layer 104 without change of polarization state is directed back toward the laser 117 and the reflected portion associated with the DNH is directed by the PBS 118 for detection. In this way, reflection from the conductive layer 104 such as a gold layer is directed back to the laser, while the reflected portion from the DNH is directed for detection.

Figure 2:
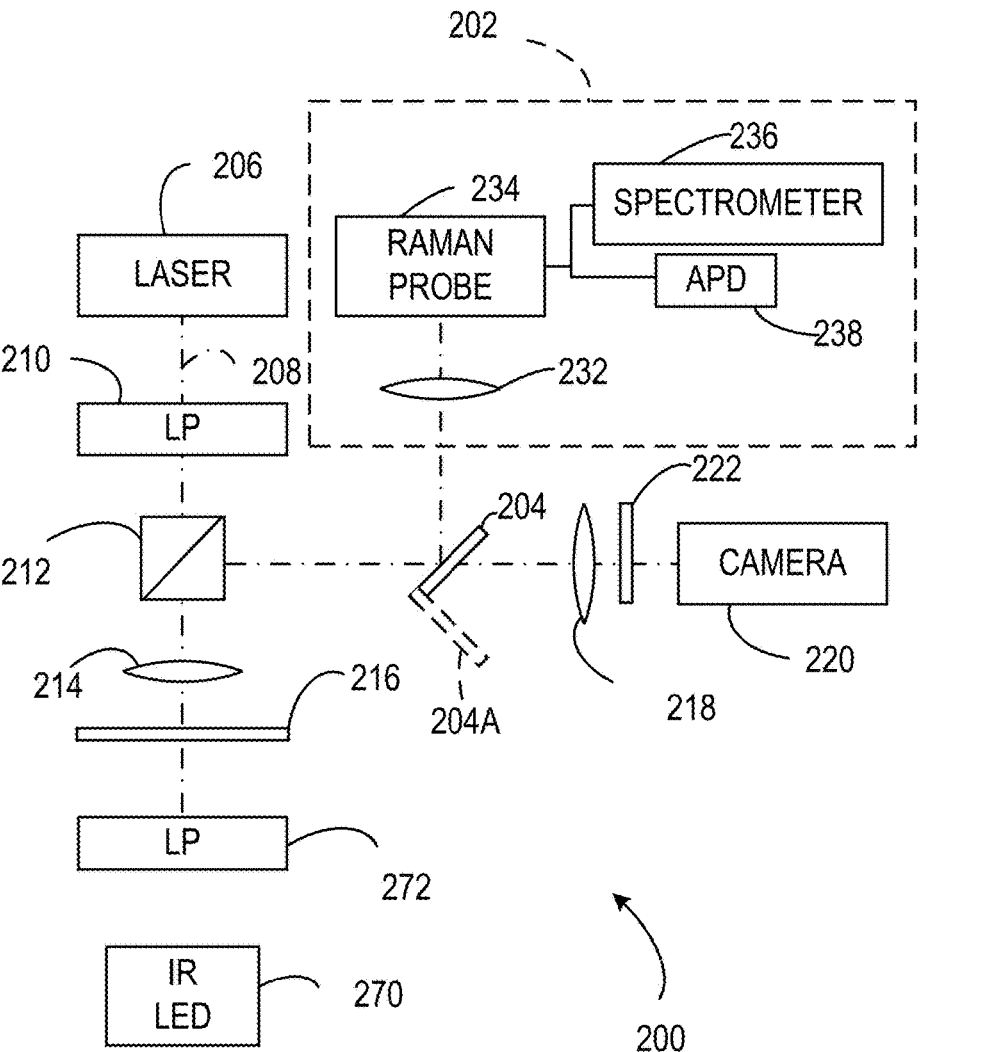
FIG. 2 illustrates a representative polarization-based optical trapping apparatus.

FIG. 2 illustrates a DNH-based reflection-mode trapping system 200. In this example, the trapping system 200 is provided with a reflector 204 that can be inserted to direct optical beams (or can be withdrawn as shown at 204B) to a Raman system 202 but the Raman system 202 can be omitted. A laser 206 is situated to direct an optical beam along an axis 208 to a linear polarizer 210 and to a polarizing beam splitter 212. The polarized optical beam is then focused with a lens 214 such as a microscope objective) to a DNH assembly 216 such as the DNH assembly of FIG. 1A. Reflected optical beam portions from the gold film defining a DNH have the same polarization as the input focused optical beam but portions associated with reflection at the DNH are associated with a different polarization that is reflected to a lens 218 and to a camera 220. In some cases, a filter such as a neutral density filter 222 is provided to reduce optical beam power at the camera. Typically, the PBS 212 (and the polarizer 210) are situated so that the optical beam incident to the DNH assembly is linearly polarized with polarization at an angle (preferably an angle of between 30 degrees and 60 degrees, such as 45 degrees) with respect to an axis through centers of the apertures defining the DNH. Additional polarization optical elements such as waveplates can be inserted to permit variation in SOP as needed.

The optional Raman system 202 includes a lens 230 situated to direct an optical beam from the DNH assembly 216 to a Raman probe 232 which is coupled to a spectrometer 234 and an avalanche photodiode (APD) 238.

In FIG. 2, the PBS 212 transmits the optical beam from the laser 206 to the DNH assembly 216, but in other examples, the PBS 212 is situated to reflect the optical beam to the DNH assembly 216 and transmit the portion of the optical beam associate with a DNH to the camera 220. The linear polarizer 210 can be omitted.

To verify performance, an IR LED 270 and linear polarizer 272 are situated to direct polarized IR toward the laser 206 and the camera 220 with results shown in FIGS. 3A-4B. In one example, a laser wavelength was 785 nm and an LED center wavelength was 940 nm.

Figures 3A, 3B, 4A, 4B:
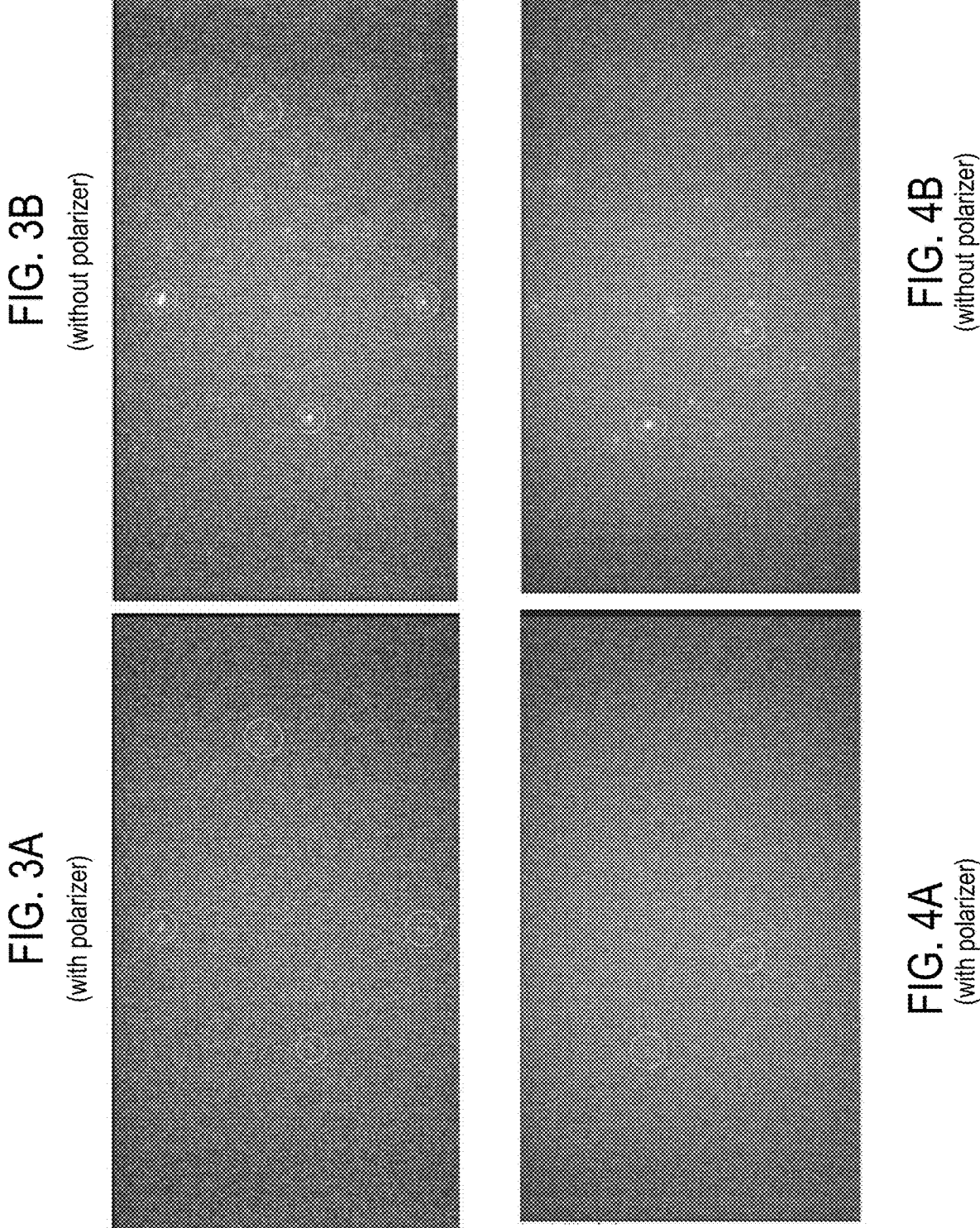
FIGS. 3A and 4A illustrate images obtained using transmitted optical radiation from an IR LED with a polarizer situated between the IR-LED and nanoholes defined in a conductive layer.
FIGS. 3B and 4B illustrate images obtained using transmitted optical radiation from an IR LED without a polarizer situated between the IR-LED and a plurality of symmetric nanoholes defined in a conductive layer. With suitable polarization-dependent optics, the symmetric nanoholes do not appear in the images or as substantially attenuated as shown in FIGS. 3A-4A in comparison with FIGS. 3B-4B.

FIGS. 3B and 4B illustrate images obtained using transmitted optical radiation from an IR LED without a polarizer situated between the IR-LED and a plurality of symmetric nanoholes defined in a conductive layer. With suitable polarization-dependent optics, the symmetric nanoholes do not appear in the images or as substantially attenuated as shown in FIGS. 3A-4A in comparison with FIGS. 3B-4B.

Figures 5A, 5B:
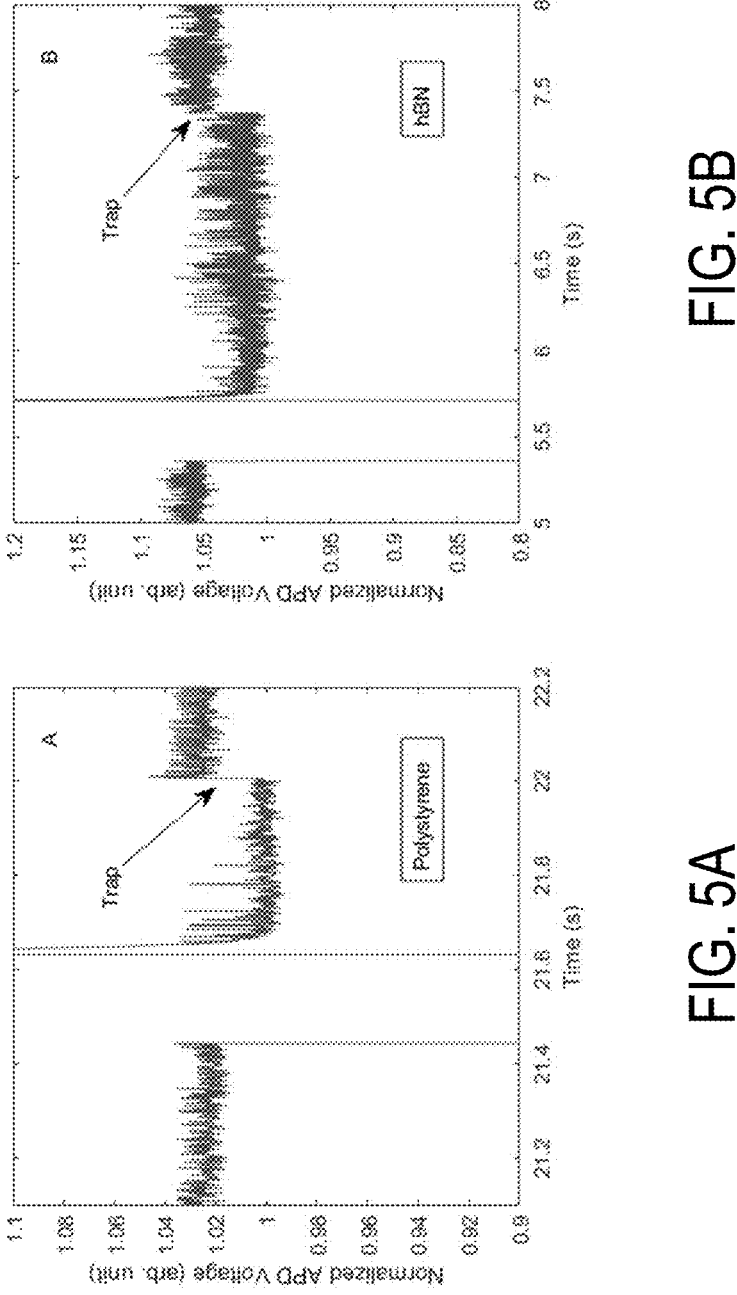
FIGS. 5A-5B illustrate trapping signals for polystyrene nanospheres and hBN, respectively, based on polarization of reflected optical power from DNHs.
Figures 5C, 5D:
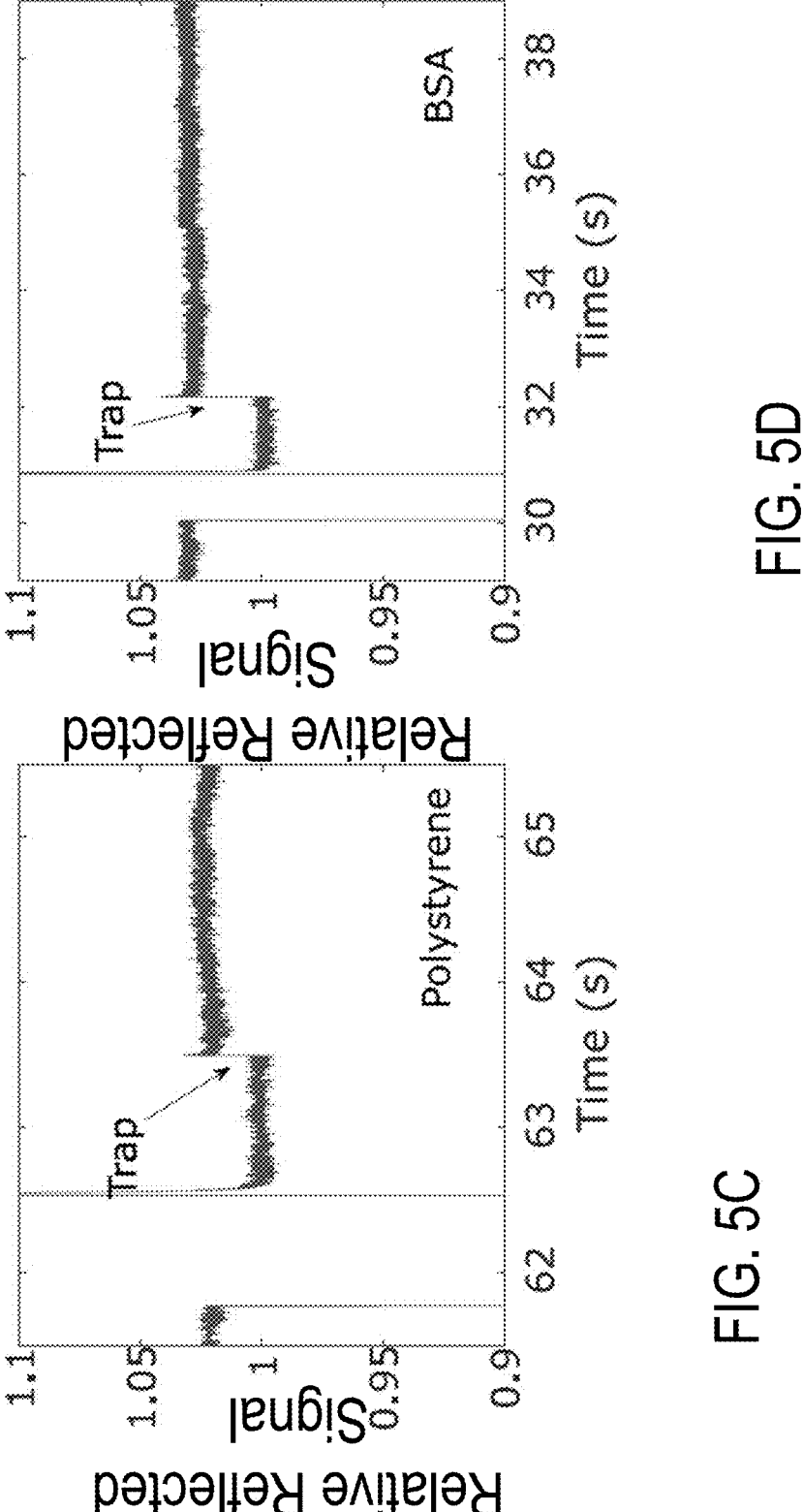
FIGS. 5C-5D illustrated trapping signals for polystyrene nanospheres and Bovine Serum Albumin (BSA), respectively, based on polarization of reflected optical power from DNHs.
Figure 6B:
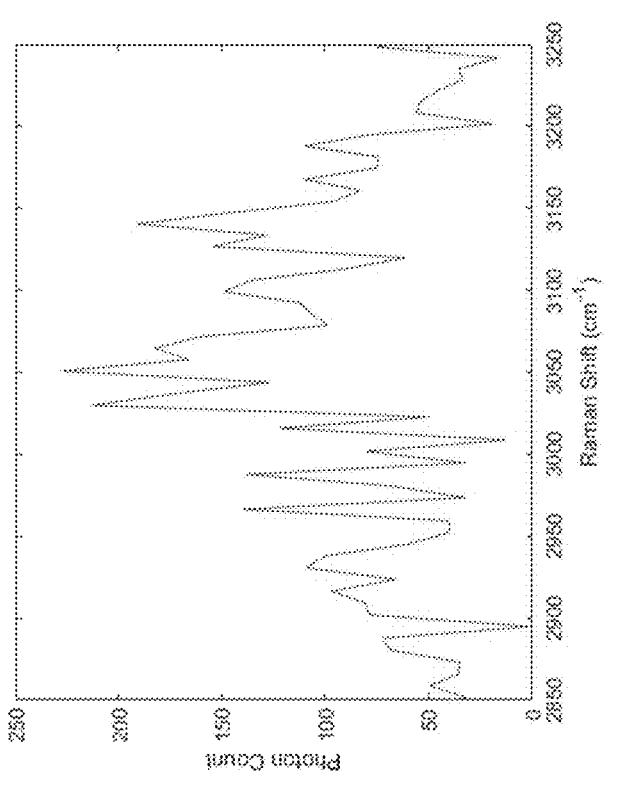
FIGS. 6A-6B illustrate Raman signals for polystyrene nanospheres based on polarization of reflected optical power from DNHs for two integration times.
Figure 6A:
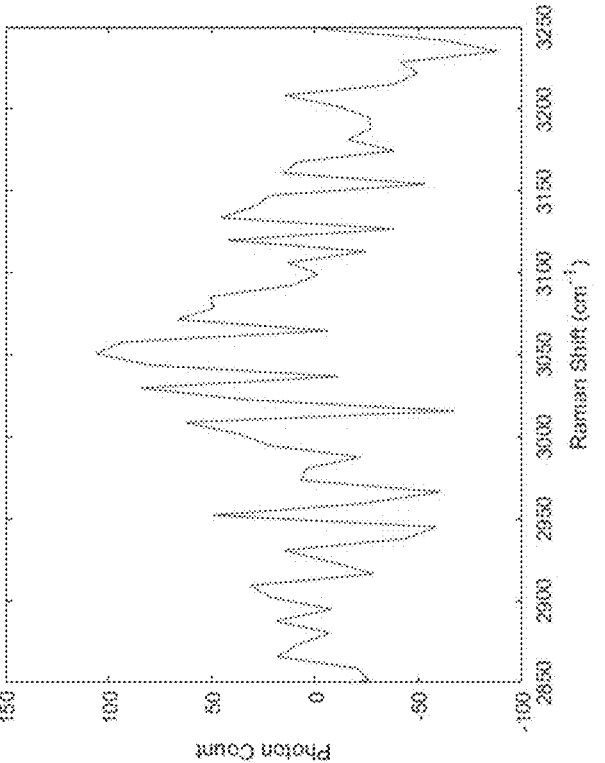

FIGS. 5A-5D and 6A-6B illustrate representative trapping signals based on reflected optical power. FIGS. 5A-5B illustrated trapping signals for polystyrene nanospheres and hBN, respectively, based on polarization of reflected optical power from DNHs. FIGS. 5C-5D illustrated trapping signals for polystyrene nanospheres and Bovine Serum Albumin (BSA), respectively, based on polarization of reflected optical power from DNHs. FIGS. 6A-6B illustrate Raman signals for polystyrene nanospheres based on polarization of reflected optical power from DNHs for two integration times.

EXAMPLE

Colloidal lithography was used to create randomly distributed DNHs in a 70 nm thick gold film. The film was sputtered on an indium tin oxide on glass substrate. The holes on the gold film are randomly distributed and have different orientations. Polystyrene nanospheres of diameter 800 nm in water with 0.01% w/w concentration were used in the drop coating method. The surface was oxygen plasma etched for 230 seconds at 30 W (Harrick, PDC-002) to reduce the aperture size and cusp separation prior to gold sputtering. The resulting DNH is as shown in FIG. 1B with hole diameter of 420 nm and cusp separation of 55 nm.

A solution containing nanoparticles to be trapped was placed in a microwell between a conductive gold layer and a microscope cover slide. A laser beam is transmitted through the gold layer onto the solution and reflected beam is directed to an oil immersion 100× objective lens, corresponding to the lens 214 of FIG. 2.

Three solutions of particles to be trapped were used: (a) polystyrene particles with average diameter of 20 nm in water with concentration of 0.02% w/v, (b) Bovine Serum Albumin (BSA) with concentration of 150 µM in phosphate buffered saline, and (c) hexagonal boron nitride nanoflakes (average thickness 3 to 4 layers and width 50-100 nm) in a solution of water and ethanol.

Degree of Polarization

Figure 7:
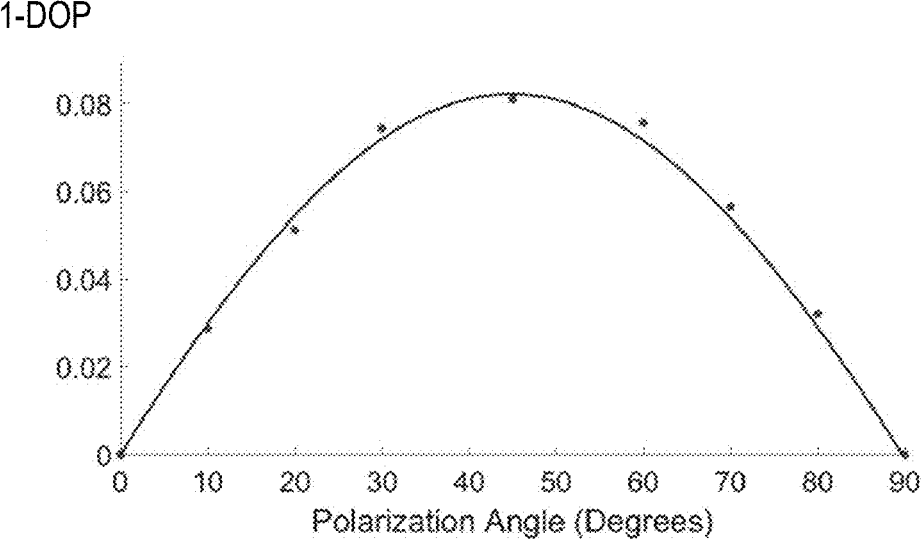
FIG. 7 is a graph of 1—degree of polarization (DOP) based on reflection from a double nanohole.

To show the cross polarized scattering from a DNH, a degree of polarization for different polarization angles of an incident beam were calculated based on simulations. FIG. 7 is a graph of 1-DOP as a function of linear polarization angle with respect to a long axis of a DNH fitted to a sinusoidal curve, wherein DOP is a degree of polarization which is calculated as:

$$DOP = \frac{I_{max} - I_{min}}{I_{max} + I_{min}},$$

wherein $I_{max}$ and $I_{min}$ are reflected beam intensities at polarization associated with an intensity maximum and an intensity minimum. The maximum $I_{max}$ is in the same polarization as the input. As shown in FIG. 7, about an input linear polarization at an angle of 45 degrees, about 8.1% of the beam is coupled into the orthogonal polarization.

In view of the many possible embodiments to which the principles of the disclosure may be applied, it should be recognized that the illustrated embodiments are only preferred examples and should not be taken as limiting the scope of the disclosure.

We claim:

1. A method, comprising:
   situating at least one particle at a double nanohole defined in a conductive structure;
   trapping the at least one particle by directing an input optical beam from a laser in a first linear state of polarization to the double nanohole and the at least one particle;
   receiving a reflected portion of the input optical beam in a first linear state of polarization from the double nanohole and directing the received portion toward the laser;
   directing a portion of an optical beam associated with the at least one particle responsive to the input optical beam from the conductive structure to a detector in a second linear state of polarization; and based on the reflected portion of the input optical beam, determining the trapping of the at least one particle at the double nanohole.

2. The method of claim 1, wherein the first linear state of polarization and the second linear state of polarization are orthogonal linear states of polarization.

3. The method of claim 1, further comprising selectively directing the portion of the optical beam associated with the at least one particle to a detection system.

4. The method of claim 1, wherein the conductive structure comprises a conductive layer.

5. The method of claim 1, further comprising situating a polarizing beam splitter to direct a portion of the reflected portion of the input optical beam in the first linear state of polarization towards the laser and to direct a portion of the reflected portion of the input optical beam in the second linear state of polarization to a detector, wherein alignment of the at least one particle at the double nanohole is determined based on a signal produced by the detector in response to the portion of the optical beam associated with the at least one particle.

6. The method of claim 1, wherein the at least one particle is a polarizing nanoparticle.

7. The method of claim 1, wherein variation in an intensity of the portion of the portion of the optical beam associated with the at least one particle is indicative of trapping of objects in a size range of 0.5 nm-100 nm.

8. The method of claim 1, further comprising detecting Brownian motion of one or more particles based on fluctuations in the reflected optical beam associated with the at least one particle.

9. The method of claim 8, further comprising estimating a particle size based on the Brownian motion.

10. The method of claim 1, further comprising determining a particle shape or size based on the portion of the optical beam associated with the at least one particle or determining a shape or size of an object trapped at the double nanohole.

11. The method of claim 1, wherein the at least one particle is a protein, peptide, DNA, a biomolecule, a lipoprotein, a hormone, an inorganic nanoparticle, or a nanorod.

12. The method of claim 1, further comprising:
   based on fluctuations in intensity of the portion of the optical beam associated with the at least one particle, transduce Brownian motion of the at least one particle into a detectable signal to determine size, or geometry of the at least one particle; and/or
   with a Raman filter, detecting inelastically scattered light from the at least one particle to determine material properties of the at least one particle; and/or
   detecting fluorescence or nonlinear optical signals from the at least one particle; and/or
   detecting optical radiation associated with the trapping with a photon counting system.

13. The method of claim 1, wherein the input optical beam in a first linear state of polarization is directed to the at least one particle situated in a sample volume from a first side of the sample volume, and further comprising supplying a sample fluid to the sample volume from a second side of the sample volume, opposite the first side.

14. The method of claim 1, wherein the at least one particle is situated in a highly absorbing or scattering medium or in a medium that contains obstructing objects.

15. The method of claim 1, wherein:
   (1) based on fluctuations in intensity of the optical beam associated with the at least one particle, transducing Brownian motion of the at least one particle into a detector signal; and/or (2) the optical beam associated with the at least one particle comprises inelastically scattered light, and the detector signal is associated with a material property of the at least one particle; and/or (3) the optical beam associated with the at least one particle comprises fluorescence or nonlinear optical signals from the at least one particle.

\* \* \* \* \*